(12) United States Patent
Gordon et al.

(10) Patent No.: US 6,652,120 B2
(45) Date of Patent: Nov. 25, 2003

(54) ELECTRIC LIGHT DISPLAY ASSEMBLY

(76) Inventors: David M. Gordon, 5559 Oak Dale La., Williamsville, NY (US) 14221; Paul F. Mancuso, Jr., 132 Ayrault Dr., Amherst, NY (US) 14228

( * ) Notice: Subject to any disclaimer, the term of this patent is extended or adjusted under 35 U.S.C. 154(b) by 0 days.

(21) Appl. No.: 09/961,468

(22) Filed: Sep. 24, 2001

(65) Prior Publication Data

US 2003/0185006 A1 Oct. 2, 2003

(51) Int. Cl.[7] ............................................. F21V 21/00
(52) U.S. Cl. ...................... 362/249; 362/252; 362/806; 362/152; 362/396; 403/381
(58) Field of Search ................. 362/249, 252, 362/806, 152, 396; 403/381, 364, 366

(56) References Cited

U.S. PATENT DOCUMENTS

| | | | | |
|---|---|---|---|---|
| 4,852,832 A | * | 8/1989 | Delaney | 248/65 |
| 4,995,181 A | * | 2/1991 | Wolf | 40/152.2 |
| 5,114,265 A | * | 5/1992 | Grisley | 403/381 |
| 5,580,160 A | * | 12/1996 | Schuler | 632/249 |
| 5,588,726 A | * | 12/1996 | Lee | 312/263 |
| 5,700,083 A | * | 12/1997 | Boechel | 362/249 |
| 5,791,762 A | * | 8/1998 | Wroblewski | 362/152 |
| 5,893,617 A | * | 4/1999 | Lee | 312/263 |
| 6,217,251 B1 | * | 4/2001 | Kato et al. | 403/341 |

* cited by examiner

Primary Examiner—Sandra O'Shea
Assistant Examiner—Jacob Y. Choi
(74) Attorney, Agent, or Firm—Howard J. Greenwald, P.C.

(57) ABSTRACT

An electric light display assembly for displaying electric lights which contains at least two rods and electric lights removably connected to the rods. A connector located between the rods engages each of the rods. Each of the rods contains a top rail section which, optionally, may contain an orifice. A wall located within the connector limits the extent to which the rods can be inserted into the connector.

19 Claims, 5 Drawing Sheets

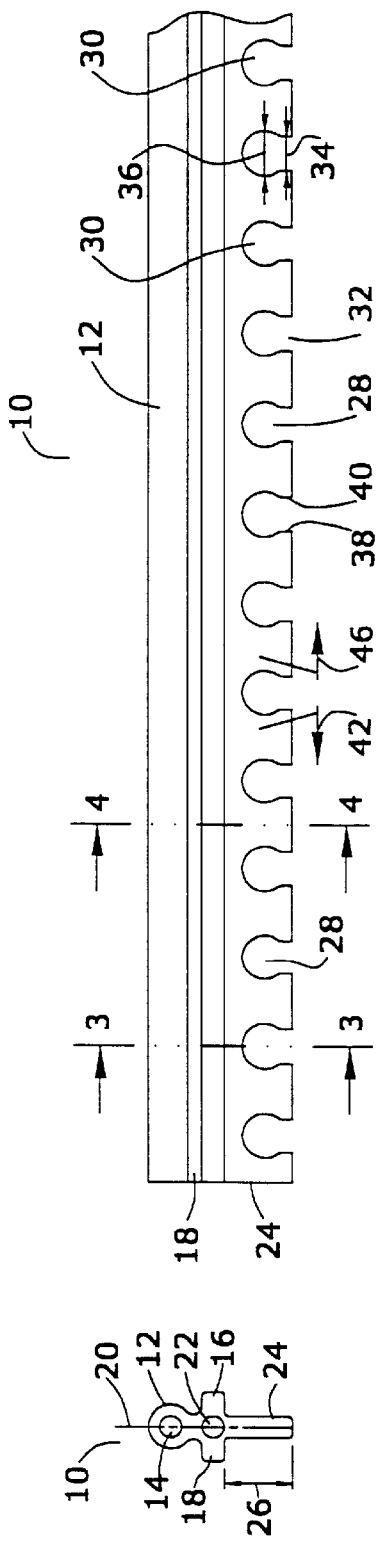
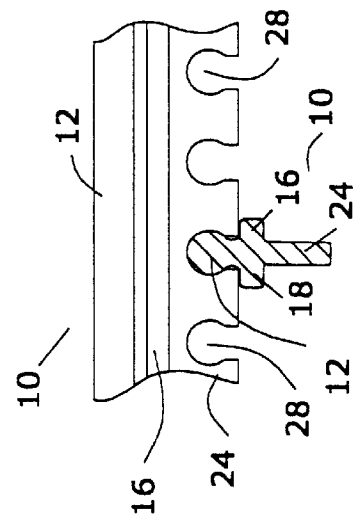
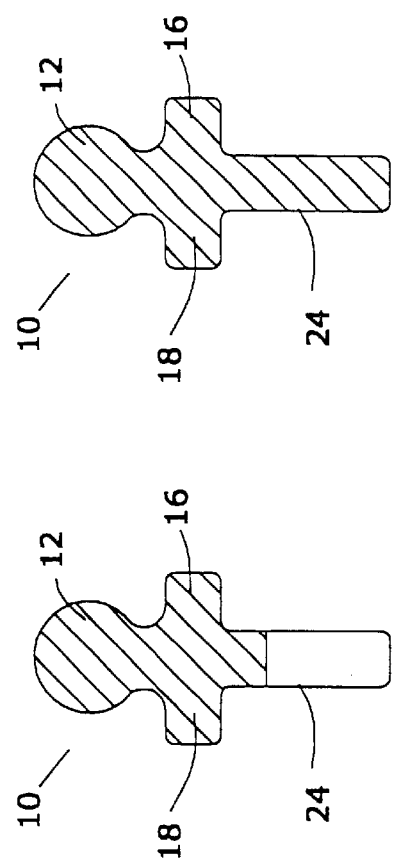
FIG. 1  FIG. 2  FIG. 3  FIG. 4  FIG. 5

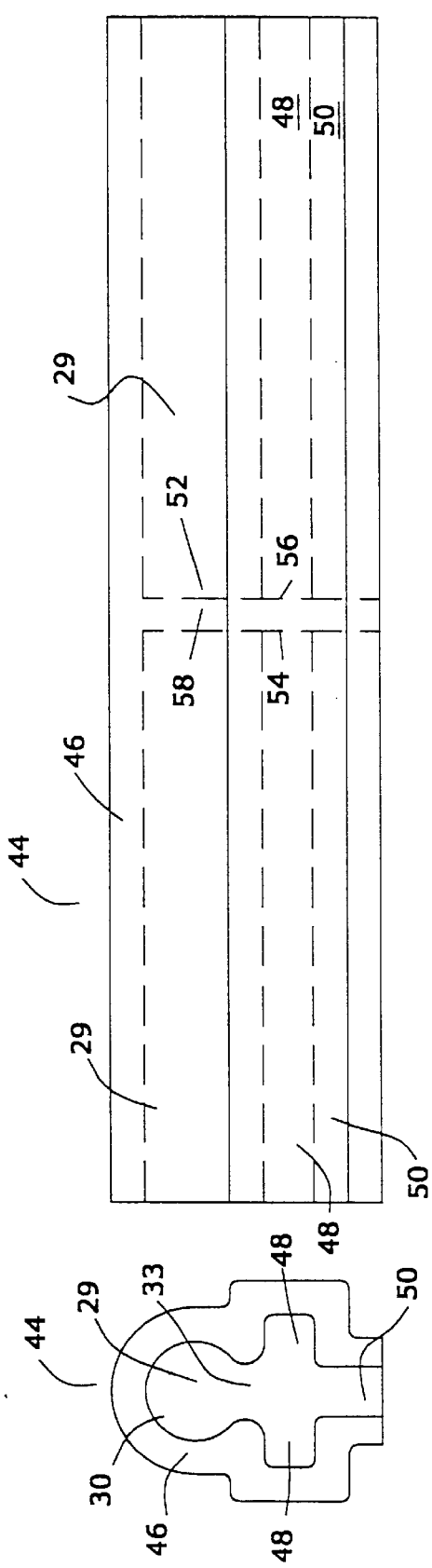
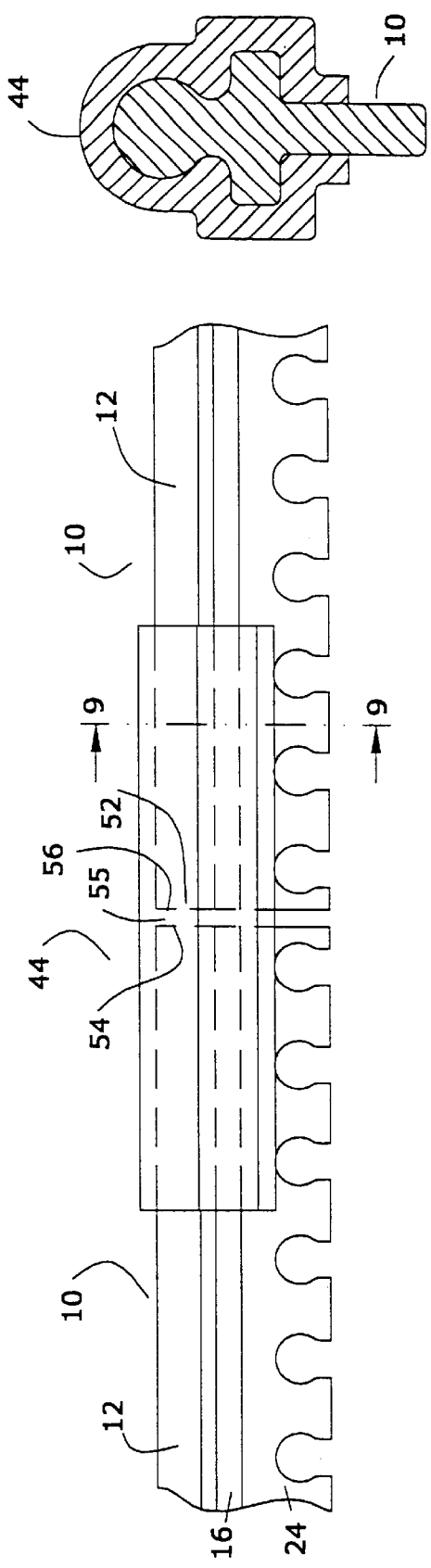

ELECTRIC LIGHT DISPLAY ASSEMBLY

FIELD OF THE INVENTION

An electric light display assembly comprised of a rod, a lamp retaining device, a connector, and electric lamps.

BACKGROUND OF THE INVENTION

U.S. Pat. No. 5,700,083 of Boechel describes a device for displaying electric lamps in a window frame, the device comprising rod means, lamp retaining means, end members, and electric lamps. The entire disclosure of this United States patent is hereby incorporated by reference into this specification.

The rod means of U.S. Pat. No. 5,700,083 includes a first intermediate member having a length nearly equal to but somewhat less than a first distance between spaced apart surfaces of the window frame.

The rod means of U.S. Pat. No. 5,700,083 also includes a plurality of first lamp retaining means provided as clip means at spaced intervals along the length of the first intermediate members.

The rod means of U.S. Pat. No. 5,700,083 also includes first end members provided at opposed terminal ends of the first intermediate member to fit between the spaced apart surfaces defining the first distance of the window frame.

In addition to such rod means, the display device of U.S. Pat. No. 5,700,083 also includes a plurality of electric lamps supported by respective ones of the plurality of lamp retaining means.

The device of U.S. Pat. No. 5,700,083 has met with a fair degree of commercial success. However, such device is not readily adaptable to produce a display assembly which will fit in a large variety of differently sized windows or doors or frames. It is an object of this invention to provide a connector which will allow the device of U.S. Pat. No. 5,700,083 to fit in a substantially infinite number of different configurations.

SUMMARY OF THE INVENTION

In accordance with this invention, there is provided an electric light display assembly comprised of a first rod means described in U.S. Pat. No. 5,700,083 (or a derivation thereof), a second rod means described in U.S. Pat. No. 5,700,083, a multiplicity of electric lamps, and connector disposed between said first means and said second rod means. The connector. The connector is slidably engaged with one end of the rod means, and contains an intermediate wall adapted to limit movement of the rod means and to receive and engage a portion of the rod means.

BRIEF DESCRIPTION OF THE DRAWINGS

The invention will be described by reference to the following drawings, in which like numerals refer to like elements, and in which:

FIG. 1 is an end view of one preferred rod of the display device of this invention;

FIG. 2 is a front view of the rod of FIG. 1;

FIG. 3 is a sectional view of the rod of FIG. 1, taken along lines 3—3;

FIG. 4 is a sectional view of the rod of FIG. 1, taken along lines 4—4;

FIG. 5 is a schematic representation of means for connecting the rod of FIGS. 1–4 to another, similar rod;

FIG. 6 is an end view of the connector used in the display device of the invention;

FIG. 7 is a front view of the connector of FIG. 6;

FIG. 8 is a side view of the connector of FIGS. 6–7 connecting two rods;

FIG. 9 is a sectional view of the device depicted in FIG. 8, taken along lines 9—9

DESCRIPTION OF THE PREFERRED EMBODIMENTS

Figure 10:
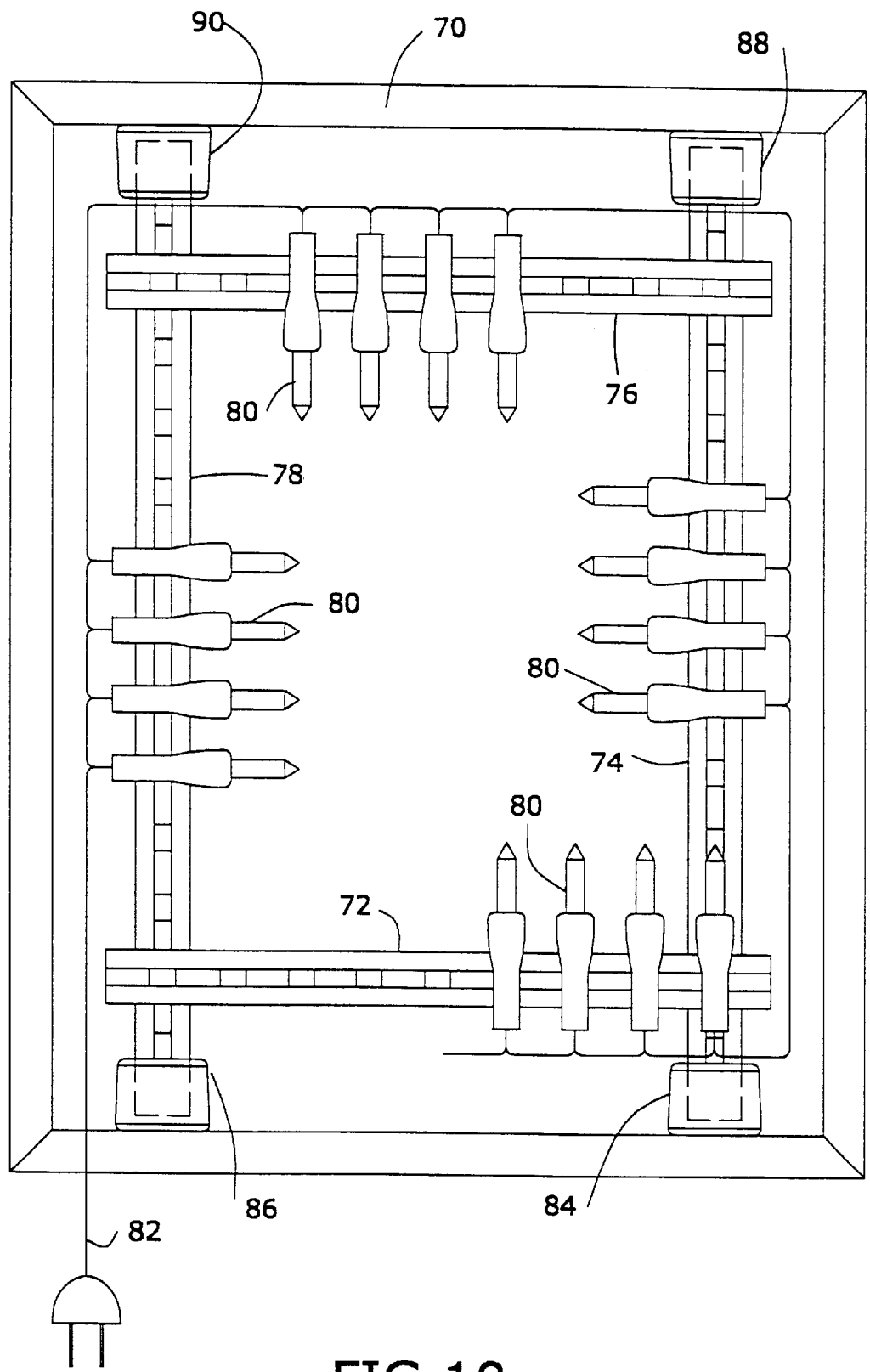
FIG. 10 is a schematic representation of the display device of this invention.

FIG. 1 is a end view of a preferred rod assembly 10. Referring to FIG. 1, and in the preferred embodiment depicted therein, rod assembly 10 is preferably an integral assembly comprised of a top rail 12.

In the embodiment depicted, rail 12 has a substantially arcuate shape. The connector described elsewhere in this specification is preferably adapted to receive such rail within an interior wall disposed within such connector.

In one preferred embodiment, depicted in FIG. 1, rail 12 is comprised of an orifice 14 which preferably extends the entire length of rail 12. This orifice 14 may be of any size which does not substantially adversely affect the mechanical properties of rail 12. In one aspect of this embodiment, the orifice 14 has a maximum dimension which is from about 5 to about 80 percent of the maximum dimension of the rail 12.

In one embodiment, the orifice 14 is filled with a reinforcing material, such as a wire, metal, polyurethane, string, etc.

Referring again to FIG. 1, and in the preferred embodiment depicted therein, it will be seen that the rod assembly 10 is comprised of a first horizontally extending wing 16 and a second horizontally extending wing 18. In the embodiment depicted, the wings 16 and 18 are substantially perpendicular to the vertical axis 20 of the rod. In another embodiment, not shown, such wings 16 and 18 may form acute and/or obtuse angles with such vertical axis 20.

Referring again to FIG. 1, and in the preferred embodiment depicted therein, each of the wings 16 and 18 is shown as having a substantially rectilinear shape. In another embodiment, not shown, the wings 16 and 18 may have other shapes, such as, e.g., arcuate shapes.

In the embodiment depicted in FIG. 1, a second orifice 22 is shown disposed between wing 16 and wing 18, preferably centrally disposed therebetween. The second orifice 22 may be the same size and/or shape as the first orifice 14, or it may be different. The device 10 may include only orifice 14, only orifice 22, both orifices 14 and 22, and/or one or more additional orifices 14 and/or 22 may extend the entire length of device 10, or it may extend only along one or more portions of such length. In one embodiment, not shown, the rod assembly 12 contains no orifices.

Referring again to FIG. 1, the rod 10 is comprised of an exterior wall 24 which has length 26 of at least about 0.2 inches and, more preferably, at least about 0.3 inches.

FIG. 2 is a front view of the rod assembly 10 from which details regarding orifices 14 and 18 have been omitted for the sake of simplicity of representation. Referring to FIG. 2, it will be seen that exterior wall 24 is comprised of a multiplicity of resilient slotted orifices 28.

For every foot of length of exterior wall 24, there should be at least about 6 such resilient slotted orifices 28. It is preferred not to use more than about 36 such slotted orifices 28 per linear foot of exterior wall 24.

The resilient slotted orifices 28 operate similarly to the lamp retaining means disclosed in U.S. Pat. No. 5,700,083, the entire disclosure of which is hereby incorporated by reference into this specification.

The resilient slotted orifices 28 are adapted to receive and removably engage the rail 12 (see, e.g., FIG. 5). Thus, e.g., the resilient slotted orifices 28 also must be substantially arcuate to conform to the arcuate surfaces of rail 12. The resilient slotted orifices 28 act as clip means.

Each of the resilient slotted orifices 28 is defined by an arcuate opening 30 communicating with a smaller entry section 32. The entry section 32 has a smaller width 34 than the maximum width 36 of the arcuate opening 30. Thus, as will be apparent, the walls 38 and 40 of entry section 32 must be moved in the directions of arrows 46 and 42 to allow rail 12 to enter arcuate opening 30 and be engaged therein by a friction fit.

As will be apparent, the clip means defined by resilient slotted orifices 28 are adapted to receive and removably engage both electrical lights and rail 12.

FIG. 3 is a sectional view of the rod 10, taken along lines 3—3. FIG. 4 is a sectional view of the rod 10, taken along lines 4—4.

FIG. 5 is a side view of a first rod 10 removably connected to second rod 10 which is substantially perpendicular to the first rod 10, extending upwardly out of the plane of the paper as well as downwardly into the plane of the paper.

As will be apparent to those skilled in the art, the slotted orifices 28 allow the connection of two rods 10 in different planes, substantially orthogonal to each other. However, these slotted orifices 28 do not allow the connection of two rods 10 in the same plane. That, however, is the function of connector 44.

FIG. 6 is an end view of one preferred embodiment of a connector 44. Referring to FIG. 6, it will be seen that connector 44 is comprised of a body 46 and, disposed therein, orifices 29, 48, and 50.

The orifice 29 in connector 44 is substantially identical to the orifice 28 in wall 24 (see FIG. 2). The latter orifice 29, like the former orifice 28, is comprised of an arcuate section 30 and an entry section 33.

The entry section 33 of connector 44 may be identical to the entry section 32 of the wall 24 of rod 10 (see FIG. 2). In the embodiment depicted in FIG. 2, the entry section 32 has substantially linear walls. In the embodiment depicted in FIG. 6, the entry section 33 has substantially arcuate walls. Other configurations for the entry section(s) will be apparent to those skilled in the art.

The entry section 33 of connector 44, and its associated arcuate section 29 orifice 48, are individually and collectively adapted to slidably engage rod 10. Thus, e.g., the orifice 48 is adapted to receive an engage with wings 16 and 18 (see, e.g., FIG. 3).

FIG. 7 is a sectional view of connector 44, taken along its horizontal axis. As will be seen, the connector 44 is comprised of an interior wall 52.

The interior wall 52 provides a multiplicity of stop surfaces on both of its sides 54 and 56. Thus, e.g., section 58 of wall 52 provides a stop surface for rail 12 (see FIG. 3).

FIG. 8 illustrates how the connector 44 may be used to connect two rods 10. The movement of one of the rods 10 is stopped by surface 54 of wall 52. The movement of the other rod 10 is stopped by surface 56 of wall 52.

FIG. 9 is a sectional view, taken along lines 9—9 of FIG. 8, showing one rod 10 removably disposed within connector 44.

FIG. 10 illustrates how a series of the rods 10 may be connected together within a frame 70. A first rod 72 is connected in to a second rod 74 in the manner depicted in FIG. 5, and the second rod 74 is connected to a third rod 76 in the manner depicted in FIG. 5, and the third rod 76 is connected to a fourth rod 78 in the manner depicted in FIG. 5. As will be apparent, at each connection point, the rods being connected are disposed in planes substantially orthogonal to each other.

Referring again to FIG. 10, a multiplicity of electric lamps assemblies are removably connected within orifices 28 (see FIG. 2). In another embodiment, the electric lamps are connected by other means to the rods 10.

In one embodiment, the electric lamp assemblies 80 are miniature Christmas lights. These miniature Christmas lights are well known. Reference may be had, e.g., to U.S. Pat. Nos. 6,059,423, 5,813,747 (Christmas tree lights), U.S. Pat. Nos. 5,624,181, 5,542,636, 5,485,068, 5,453,664, 5,428,516, 5,410,458, 5,236,374, 5,094,632, 5,682,079, 4,544,318, 4,253,267, and the like. The entire disclosure of each of these United States patents is hereby incorporated by reference into this specification.

In one embodiment, the electric lamp assemblies are comprised of an electric cord 82 (see FIG. 10).

Referring again to FIG. 10, it will be seen that the assembly depicted in comprised of end members 84, 86, 88, and 90. These end members are provided at opposed terminal ends of the rod 10, and they fit between the spaced apart surfaces of the frame 70 to effect a snug friction fit of the device within such frame.

One may use any suitable end members adapted to secure the rods 10 to the inside surfaces of the frame 70. Thus, by way of illustration, one may use the compressible ends means 28 described in U.S. Pat. No. 5,700,083. These compressible end means 28 are in the shape of cups.

Figure 10A:
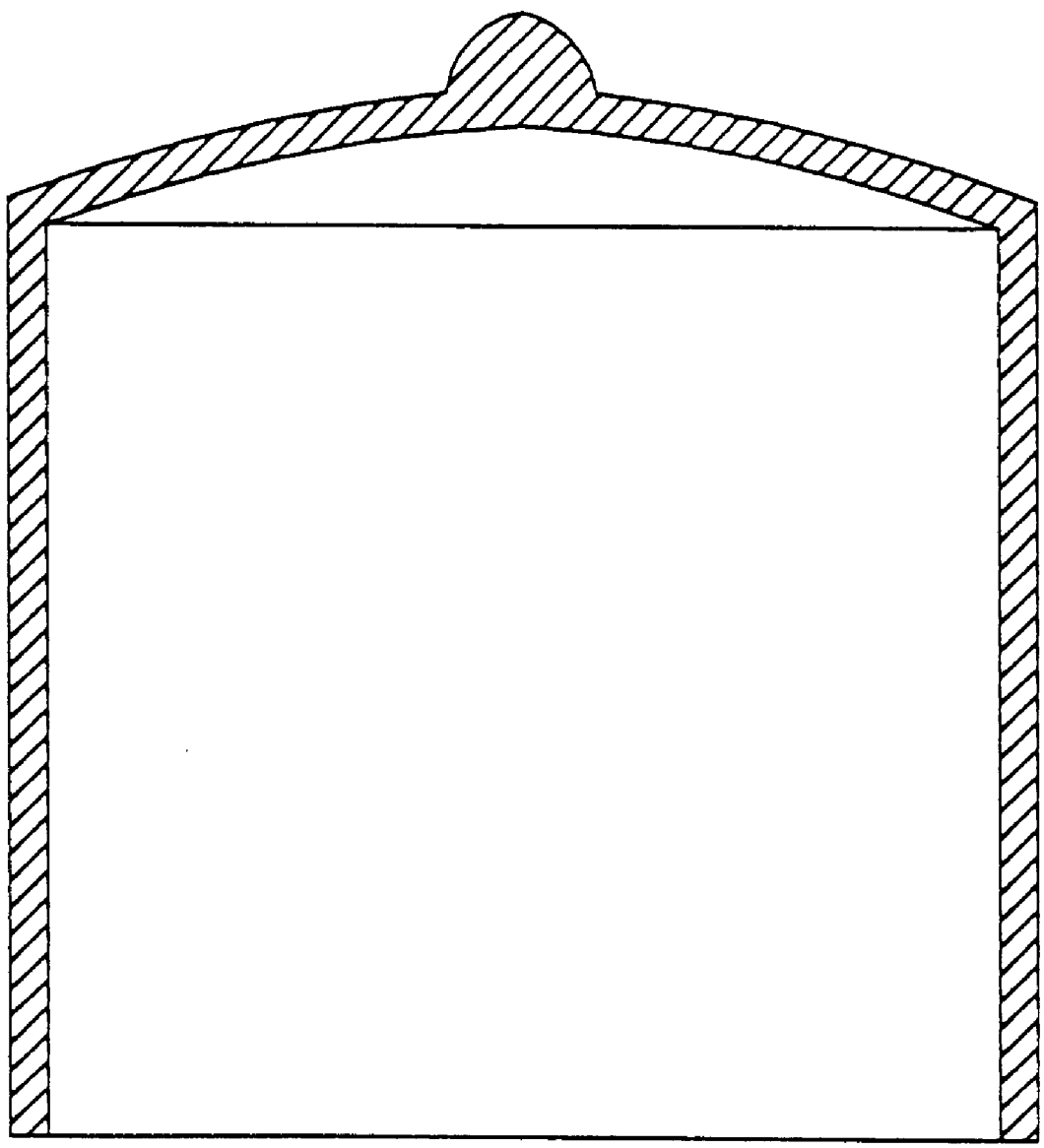
FIG. 10A is a sectional view of an expandable and compressible end means of the display device of this invention.

In the embodiment depicted in FIG. 10, the end means 84, 86, 88, and 90 is preferably an expandable and compressible caps 84, a sectional view of which is presented in FIG. 10A.

Figure 11:
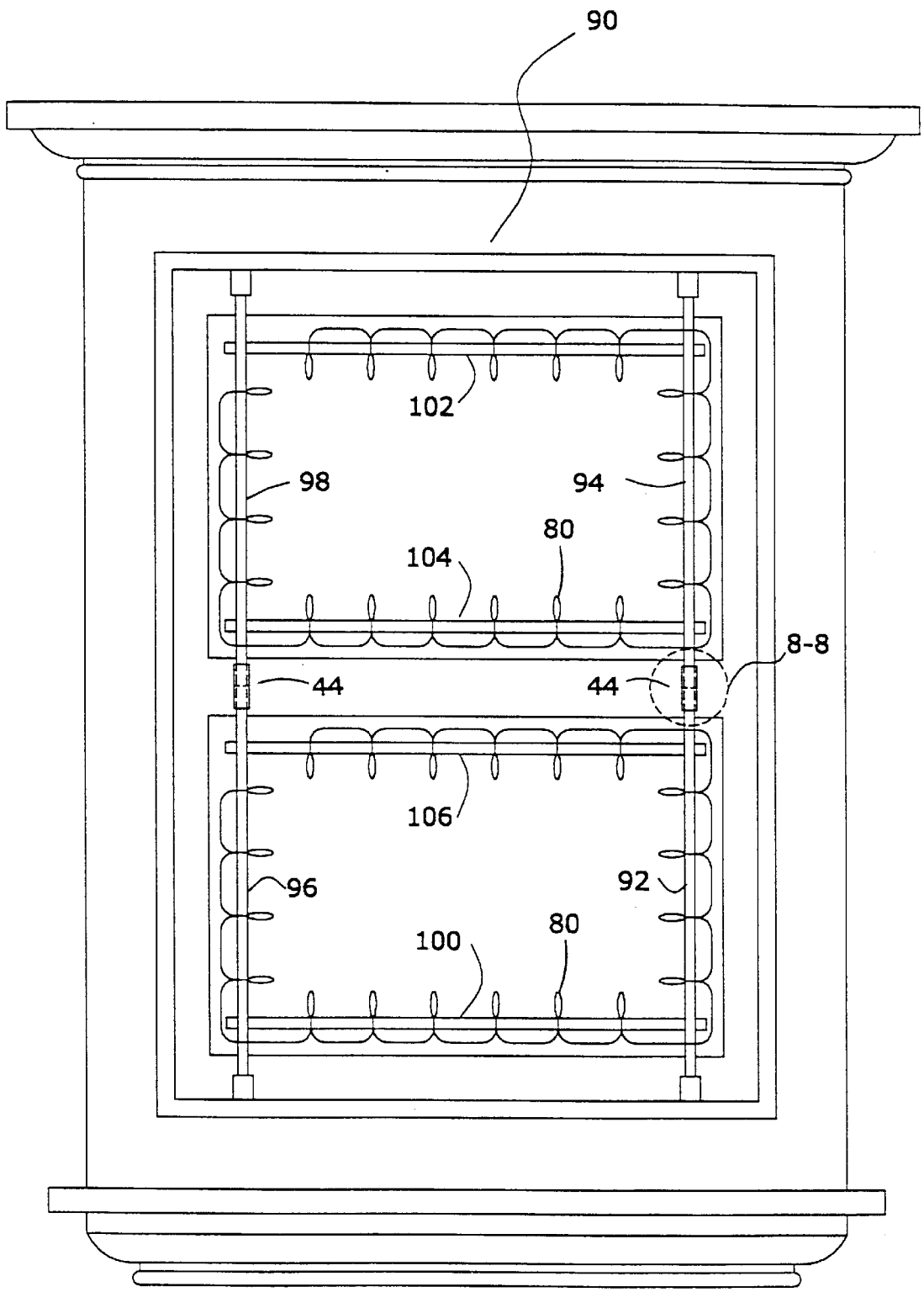
FIG. 11 is another schematic representation of the display device of this invention.

FIG. 11 shows a frame 90 within which is disposed an assembly similar to that depicted in FIG. 10 but differing therefrom in that rod assemblies 92, and 94 are connected by means of connector 44, and rod means 96 and 98 are also connected by means of a connector 44. A detailed view of the connector 44, enclosed in circle 8—8 of FIG. 11, is provided in FIG. 8. Cross rods 100, 102, 104, and 106 are connected to rods 92/94/96/98 by the use of orifices 28, as is more clearly depicted in FIG. 5. Christmas light assemblies 80 are connected to the various rods, using orifices 28, in the manner depicted.

As will be apparent, by the means of connector 44, and/or by using orifices 28, one may make a multiplicity of different shapes and designs in both the X axis, the Y axis, and the Z axis, thereby being able to make many different two dimensional, three dimensional, and four dimensional designs with the rods 10 which can be ornamented with the miniature Christmas tree lights. The rods 10, or comparable rods 10, can be made in a variety of shapes, sizes, and configurations to enable "Christmas tree light artists" to design ever more complex and wonderful designs.

The rod 10 assembly is preferably constructed from a rigid plastic material which has some degree of flexibility. One suitable plastic material which may be used is, e.g., "Compound 51", which is sold by the Vinylex Corporation of Knoxville, Tenn.

The plastic material used to construct the rod assembly 10 preferably has a tensile strength (as measured by A.S.T.M. D638) of from about 5,000 to about 75,000 pounds per square inch, a flexural modulus (as measured by A.S.T.M. D790) of from about 280,000 to about 460,000 pounds per square inch, a deflection temperature at 264 pounds per square inch (as measured by A.S.T.M. D648) of from about 135 to about 180 degrees Fahrenheit, and a specific gravity (as measured by A.S.T.M. D792) of from about 1.25 to about 1.6.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims adapted to be connected to an electric power source to power the electric lamps. See, e.g., U.S. Pat. No. 5,700,083; the entire disclosure of this United States patent is hereby incorporated by reference into this specification.

We claim:

1. An electric light display assembly comprising a first rod, a second rod, and a connector, wherein:
   a) said first rod comprises a first top rail, a first wing disposed beneath said first top rail, a second wing disposed beneath said first top rail, and a first exterior wall disposed beneath said first top rail, said first exterior wall comprising a multiplicity of resilient slotted orifices;
   b) said second rod comprises a second top rail, a third wing disposed beneath said second top rail, a fourth wing disposed beneath said second top rail, and a second exterior wall disposed beneath said second top rail, said second exterior wall comprising a multiplicity of resilient slotted orifices;
   c) said connector comprises a body comprising a first set of orifices disposed in a first end thereof, a second set of orifices disposed in a second end thereof, and an interior wall disposed between said first set of orifices and said second set of orifices; and
   d) a first end of said first rod is slidably engaged with said first set of orifices disposed in said connector; and a first end of said second rod is slidably engaged with said second set of orifices disposed in said connector.

2. The electric light display assembly as recited in claim 1, wherein each of said first top rail of said first rod and said second top rail of said second rod has an arcuate shape.

3. The electric light display assembly as recited in claim 2, wherein each of said first and said second wings of said first rod, and said third and said fourth wings of said second rod have rectilinear shape.

4. The electric light display assembly as recited in claim 3, wherein each of said first exterior wall of said first rod and said second exterior wall of said second rod has a length of at least about 0.2 inches.

5. The electric light display assembly as recited in claim 3, wherein each of said multiplicity of resilient slotted orifices of said first rod and said multiplicity of resilient slotted orifices of said second rod is comprised of at least about six orifices per foot.

6. The electric light display assembly as recited in claim 1, further comprising compressible end means disposed on a second end of said first rod and on a second end of said second rod.

7. The electric light display assembly as recited in claim 6, wherein said compressible end means comprises an expandable and compressible cap.

8. The electric light display assembly as recited in claim 1, further comprising a multiplicity of electric lamp assemblies removably connected within said resilient slotted orifices of said first rod and said second rod.

9. An electric light display assembly comprising a first rod, a second rod, wherein:
   a) said first rod comprises a first top rail having an arcuate shape, a first wing disposed beneath said first top rail, a second wing disposed beneath said first top rail, and a first exterior wall disposed beneath said first top rail, said first exterior wall comprising a multiplicity of resilient slotted orifices;
   b) said second rod comprises a second top rail having an arcuate shape, a third wing disposed beneath said second top rail, a fourth wing disposed beneath said second top rail, and a second exterior wall disposed beneath said second top rail, said second exterior wall comprising a multiplicity of resilient slotted orifices;
   c) said resilient slotted orifices of said first exterior wall of said first rod and said second exterior wall of said second rod are each defined by an arcuate opening communicating with a smaller entry section;
   d) said second rod is disposed orthogonally to said first rod, and said second top rail of said second rod is removably engaged with one of said resilient slotted orifices of said first exterior wall of said first rod.

10. The electric light display assembly as recited in claim 9, wherein each of said multiplicity of resilient slotted orifices of said first rod and said multiplicity of resilient slotted orifices of said second rod is comprised of at least about six orifices per foot.

11. The electric light display assembly as recited in claim 9, further comprising compressible end means disposed on a first end and a second end of said first rod.

12. The electric light display assembly as recited in claim 9, further comprising a multiplicity of electric lamp assemblies removably connected within said resilient slotted orifices of said first rod and said second rod.

13. An electric light display assembly comprising a first rod, a second rod, a third rod, and a fourth rod, wherein:
   a) each of said first rod, said second rod, said third rod, and said fourth rod comprises a top rail having an arcuate shape, a first wing disposed beneath said top rail, a second wing disposed beneath said top rail, and an exterior wall disposed beneath said top rail, said exterior wall comprising a multiplicity of resilient slotted orifices, each of said orifices defined by an arcuate opening communicating with a smaller entry section;
   b) said second rod is disposed orthogonally to said first rod, and said top rail of said second rod is removably engaged with one of said resilient slotted orifices of said exterior wall of said first rod;
   c) said third rod is disposed orthogonally to said second rod and substantially parallel to said first rod, and said top rail of said second rod is removably engaged with one of said resilient slotted orifices of said exterior wall of said third rod; and
   d) said fourth rod is disposed orthogonally to said third rod and substantially parallel to said second rod, and said top rail of said fourth rod is removably engaged with one of said resilient slotted orifices of said exterior wall of said third rod.

14. The electric light display assembly as recited in claim 13, wherein each of said multiplicity of resilient slotted orifices of said first rod, said multiplicity of resilient slotted orifices of said second rod, said multiplicity of resilient slotted orifices of said third rod, and said multiplicity of resilient slotted orifices of said fourth rod is comprised of at least about six orifices per foot.

15. The electric light display assembly as recited in claim 13, further comprising compressible end means disposed on a first end and a second end of said first rod, and on a first end and a second end of said third rod.

16. The electric light display assembly as recited in claim 13, further comprising a multiplicity of electric lamp assemblies removably connected within said resilient slotted orifices of said first rod, said second rod, said third rod, and said fourth rod.

17. The electric light display assembly as recited in claim 13, further comprising a fifth rod, a sixth rod, a seventh rod, an eighth rod, a first connector, and a second connector, wherein:

a) each of said first connector and said second connector comprises a body comprising a first set of orifices disposed in a first end thereof, a second set of orifices disposed in a second end thereof, and an interior wall disposed between said first set of orifices and said second set of orifices;

b) each of said fifth rod, said sixth rod, said seventh rod, and said eighth rod comprises a top rail having an arcuate shape, a first wing disposed beneath said top rail, a second wing disposed beneath said top rail, and an exterior wall disposed beneath said top rail, said exterior wall comprising a multiplicity of resilient slotted orifices, each of said orifices defined by an arcuate opening communicating with a smaller entry section;

c) said sixth rod is disposed orthogonally to said fifth rod, and said top rail of said sixth rod is removably engaged with one of said resilient slotted orifices of said exterior wall of said fifth rod;

d) said seventh rod is disposed orthogonally to said sixth rod and substantially parallel to said fifth rod, and said top rail of said sixth rod is removably engaged with one of said resilient slotted orifices of said exterior wall of said seventh rod;

e) said eighth rod is disposed orthogonally to said seventh rod and substantially parallel to said sixth rod, and said top rail of said eighth rod is removably engaged with one of said resilient slotted orifices of said exterior wall of said seventh rod;

f) a first end of said first rod is slidably engaged with said first set of orifices disposed in said first connector; and a first end of said fifth rod is slidably engaged with said second set of orifices disposed in said first connector; and g) a first end of said third rod is slidably engaged with said first set of orifices disposed in said second connector; and a first end of said seventh rod is slidably engaged with said second set of orifices disposed in said second connector.

18. The electric light display assembly as recited in claim 17, further comprising compressible end means disposed on a second end of said first rod, and on a second end of said third rod, and on a second end of said fifth rod, and on a second end of said seventh rod.

19. The electric light display assembly as recited in claim 17, further comprising a multiplicity of electric lamp assemblies removably connected within said resilient slotted orifices of said first rod, said second rod, said third rod, said fourth rod, said fifth rod, said sixth rod, said seventh rod, and said eighth rod.

* * * * *